United States Patent [19]

Kaiser

[11] 4,106,378
[45] Aug. 15, 1978

[54] APPARATUS FOR AVOIDING PLAY IN THE DRIVE OF A CIRCULAR SAW

[75] Inventor: Gerhard Kaiser, Metzingen, Fed. Rep. of Germany

[73] Assignee: Gustav Wagner Maschinenfabrik, Reutlingen, Fed. Rep. of Germany

[21] Appl. No.: 832,747

[22] Filed: Sep. 12, 1977

[30] Foreign Application Priority Data

Sep. 15, 1976 [DE] Fed. Rep. of Germany ....... 2641465

[51] Int. Cl.² .............................................. B23D 45/00
[52] U.S. Cl. .......................................... 83/74; 83/491; 83/593
[58] Field of Search ...................... 83/62.1, 62, 58, 74, 83/491, 469, 593

[56] References Cited

U.S. PATENT DOCUMENTS 3,512,440  5/1970  Frydmann ............................. 83/491

*Primary Examiner*—J. M. Meister
*Attorney, Agent, or Firm*—W. G. Fasse; D. F. Gould

[57] ABSTRACT

In circular saws, especially of the so-called cold type, for steel and nonferrous metals, there is a certain play in the gear drive or power transmission between the prime mover such as an electric motor and the saw blade proper. Especially during the start and during the completion of a sawing operation such play causes a temporary stopping of the blade. To avoid such play a brake mechanism with blade engaging brake shoes is provided which is energized and de-energized in response to the current consumption of the electric saw drive motor or in response to position responsive switch means, whereby the brake is effective during the start and during the stopping of the saw blade.

10 Claims, 5 Drawing Figures

APPARATUS FOR AVOIDING PLAY IN THE DRIVE OF A CIRCULAR SAW

BACKGROUND OF THE INVENTION

The present invention relates to an apparatus for avoiding play in the drive of a circular saw. More particularly, the invention is especially suitable for saws for cutting steel and nonferrous metals, wherein high speed steel circular saw blades are used. Generally such circular saws do not comprise so-called braced transmissions, namely, transmissions operating without any play. Therefore, when the cut is started, that is, when only one or two teeth of the circular saw blade engage the workpiece, the disadvantage occurs, that the rotation of the saw blade relative to the workpiece comes temporarily to a standstill. Further rotation of the saw blade occurs only when the drive continues, when all play between the flanks of the gear teeth has been eliminated and when all shafts are subject to a torsion corresponding to the force to be transmitted. The rotation of the saw blade continues to the end of the operation until only one tooth remains in engagement with the workpiece or at the very beginning of a cutting operation, no saw tooth is in engagement with the workpiece. At these points of operation all torsion spring forces in the gear shaft are relaxed and the play between the flanks of the gear teeth is re-established so that the circular saw blade turns faster for a short circumferential length until the next tooth engages the workpiece and the just described sequence begins over again.

It is evident from the just described operation that the saw blade teeth newly engaging the workpiece strike the latter with great force. If, in the course of the further feed advance of the saw three, four, or more teeth simultaneously engage the workpiece, the restoring moment of the circular saw blade resulting from the cutting forces, becomes so large that all gear teeth and bearing plays are eliminated so that all shaft torques are maintained, whereby a uniform sawing takes place without and "hammering action". When the workpiece is almost cut through the fewer and fewer teeth engage the workpiece, the above described disadvantage occurs again.

The just described "hammering" is not necessarily damaging to the teeth of circular saw blades made of high speed steel or which include so-called inserted teeth of high speed steel. However, if one used in such machines hard metal or carbide tipped saw blades, it is quite possible that fragments of the hard metal teeth split off or that these teeth entirely break out of their soldering or brazing joints, thereby making the entire blade useless.

Because of this problem, circular saw machines that are made for use with carbide tipped blades, are manufactured with braced gear transmissions which are completely free of any blade. There are several approaches to produce such a braced transmission but all are rather involved and hence substantially more expensive than a normal gear transmission.

OBJECTS OF THE INVENTION

In view of the above, it is the aim of the invention to achieve the following objects, singly or in combination:

to avoid the disadvantages of the prior art, more specifically, to modify a conventional cold circular saw for steel and non-ferrous metal so that any play in its drive transmission may be compensated by an attachment brake which may be connected to conventional saws.

to provide a circular saw which makes it possible to use carbide tipped circular saw blades without the need for a so-called braced saw gear transmission, thereby substantially reducing the costs for such machines;

to provide a saw-blade brake which is effective at the beginning of a sawing operation as well as the end of a sawing operation;

to provide a saw blade brake which is operated in response to the current consumption of the electric drive motor of the saw; and to provide a saw blade brake which is activated and deactivated by position responsive switch means operated by the feed advance of the saw.

SUMMARY OF THE INVENTION

According to the invention there is provided a saw blade brake which is effective during the starting of a cut, as well as during the termination of a cut. According to the invention the circular saw blade may be subjected to a brake action only during the starting and termination of the sawing operation. For this purpose an apparatus is additionally secured to the saw sled or carriage so that the saw blade is positioned between two brake shoes. One brake shoe is adjustable in its position, for example, by hand and may be brought to a position substantially contacting the saw blade. The other brake shoe may be power operated, for example, by hydraulic means and only during the starting and termination of a sawing operation. The switching on and off of the brake shoe operating power means such as a hydraulic piston cylinder arrangement may be accomplished in one embodiment in response to the current consumption of the drive motor of the sawing machine, whereby a braking action is effective when the current is low or below a certain threshold, and whereby the braking action is switched off when the current is large or above a certain threshold level.

According to another embodiment the same function may be accomplished by employing cam operated switches responsive to the feed advance of the saw blade supporting sled or carriage to provide a signal at the very start of a sawing operation and a further signal when several saw teeth are engaging the workpiece. Similarly, further switches are provided to sense the approach of the saw carriage to a position where the sawing operation is about to be terminated and where the operation is terminated in fact.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
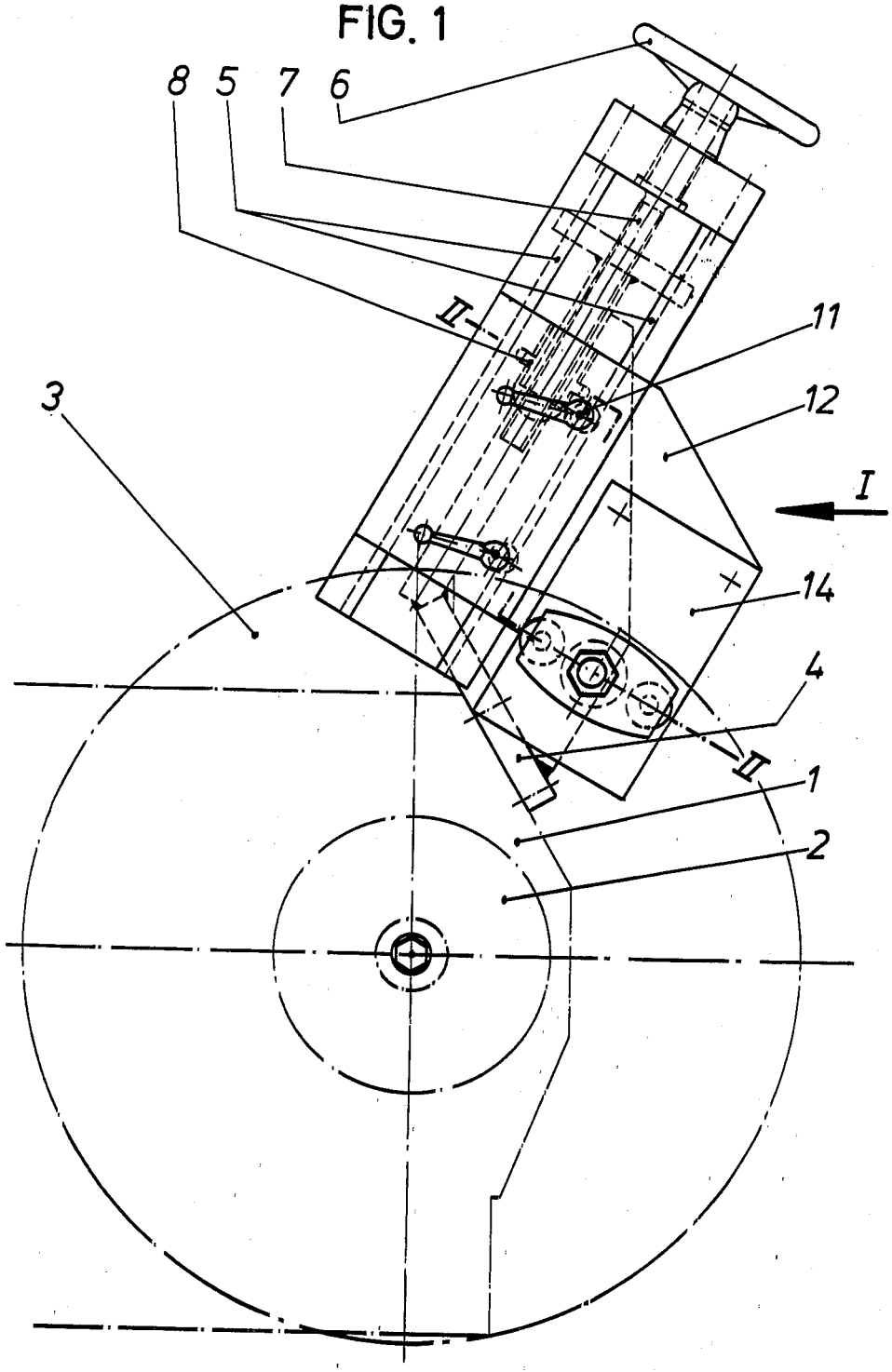
FIG. 1 shows a side view of the circular saw blade with a saw gear box illustrated behind the blade by dash-dotted lines, whereby the apparatus according to the invention is secured to the gear box of the saw.

According to FIG. 1 the circular saw blade 3 which is merely shown by a dash-dotted line representing the outer circumference of its teeth, is secured by means of screws to the saw shaft 2 driven through the gear box 1. The shaft 2 and the bear box 1 are only illustrated by dash-dotted lines to provide background information so to speak. The saw supporting sled or carriage 12 is supported for guided movement along dove tailed guide means 5 supported on the mounting 4 also shown in FIGS. 2 and 3. The sled 12 may be adjusted in its position along the guide means 5 by means of an adjustment screw 8 and a spindle 7 rotatable by a hand wheel 6. The sled 12 may be secured in an adjusted position by means of hand levers 11 operating the clamping pieces 10 through threaded spindles 9.

Figure 2:
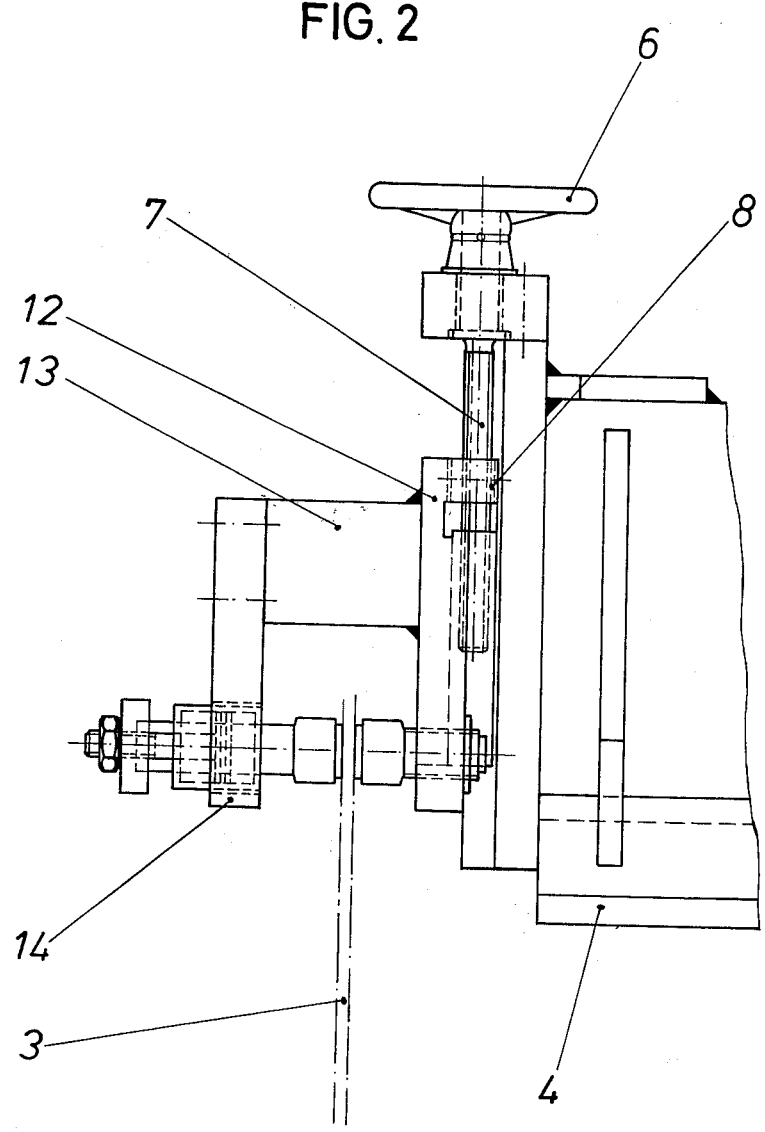
FIG. 2 shows a view in the direction of the arrow I in FIG. 1.

FIG. 2 shows a support member 13 welded to the support sled or carriage 12. The support member 13 reaches above and across the saw blade 3. A further support member 14 reaches radially inwardly relative to the saw blade and on the side opposite to the support sled 12. The support member 14 may, for example, be bolted and pinned to the support member or cross piece 13, please also see FIGS. 1 and 3.

Figure 3:
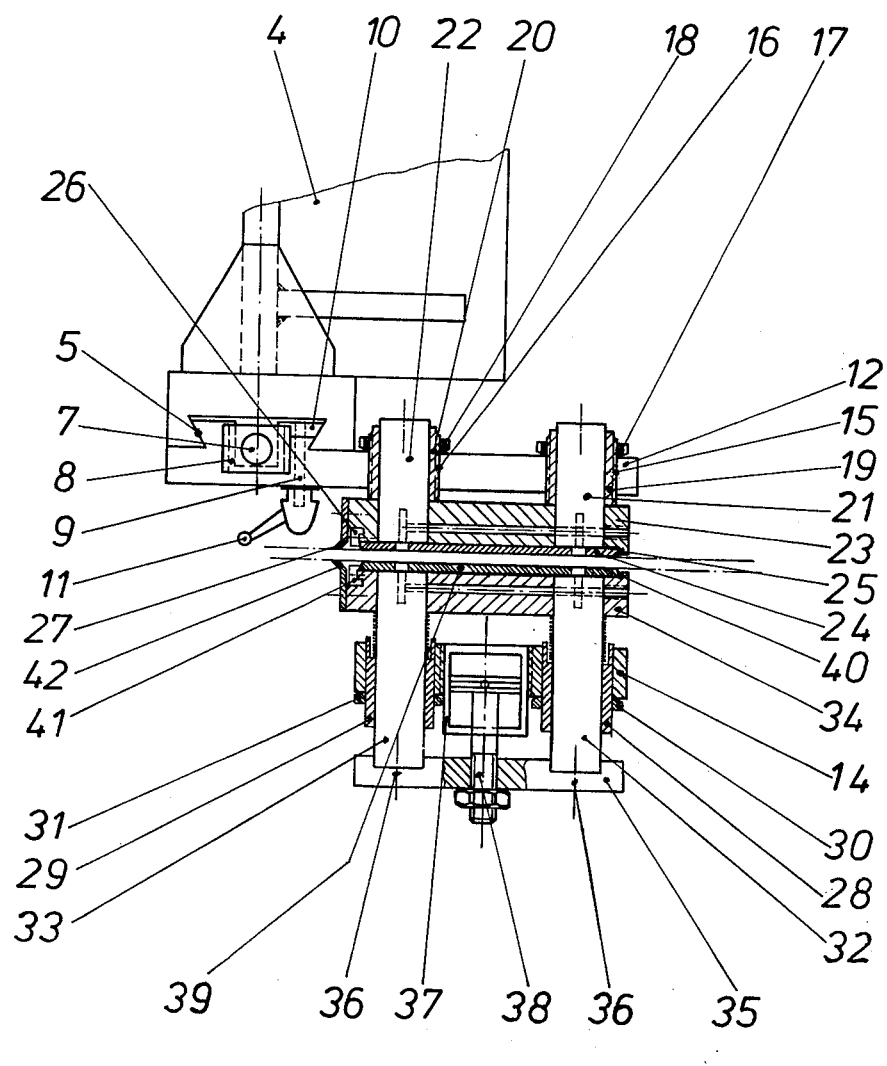
FIG. 3 is a sectional view through the apparatus according to the invention along section line II—II in FIG. 1.

Referring to FIG. 3, the support member or carriage 12 which extends laterally away from the dovetail guide 5, is provided with two threaded holes 15 and 16. A threaded bushing 19 and 20 is screwed into each of the threaded holes 15 and 16. Each bushing 19, 20 in turn is secured in position by means of a respective lock nut 17 and 18. A gliding guide bar 21 and 22 is slidingly received in each of these bushings 19 and 20. A brake shoe 23 is secured to the free ends of the guide bars 21 and 22, whereby the brake shoe 23 is securely held against rotation. The saw blade facing side of the brake shoe 23 carries a brake lining 24 secured in a dovetail groove formed by the milled recess 25 and the clamping piece 26. A dirt guard or scraper 27 overlaps the clamping piece 26. The brake lining 24 may be replaced by loosening the clamping piece 26 by conventional means not shown. The position of the brake lining, or rather, the plane of the brake lining next to the saw blade 3 may be adjusted by loosening the lock nuts 17 and 18, rotating the bushings 19 and 20 and then tightening the lock nuts again. The guide bar 21 and 22, as well as the brake shoe 23 and the brake lining 24 are provided with bores shown by dashed lines for supplying cooling air under pressure to the saw blade 3 directly at the brake zone for cooling the saw blade.

Incidentally, the just described adjustment of the position of the brake shoe 23 with its brake lining 24 is accomplished so that the brake lining 24 just lightly touches the saw blade 3 so that hardly any friction takes place during the normal operation of the saw, when the brake apparatus is not in action.

The just described structure forms one brake unit. A similar brake unit is arranged on the opposite side of the saw blade and supported by the third support member or plate 14 also provided with threaded holes receiving threaded bushings 28 and 29 secured by lock nuts 30 and 31. The guide bars 32 and 33 slide in the bushings 28, 29. The free ends of the bars 32 and 33 carry a further brake shoe 34 secured against rotation. The opposite also free ends of the bars 32 and 33 are connected by screws 36 to a cross bar 35.

A relatively small operating means, for example, a piston cylinder arrangement comprising a cylinder 37 and a piston rod 38 is also supported by the third support member 14. For example, the cylinder 37 may be threaded into the support plate 14 as shown and the piston rod 38 is secured to the cross bar 35, for example, by a threaded connection as shown. When a fluid under pressure is supplied to the cylinder, the piston rod 38 may be moved up and down in FIG. 3, thereby either pressing the brake shoe 34 with its lining 39 against the saw blade 3 or releasing the saw blade. The brake lining 39 is secured in a milled recess 40 and held by a clamping piece 41 forming a dovetail groove or recess as described above. Here again the clamping piece 41 is overlapped by a dirt scraper or guard 42 for removing any sawdust or shavings from the blade before it enters the space between the two brake linings 24 and 39.

The guide bars 32 and 33 as well as the brake shoes 34 and its brake lining 39 are also provided with bores shown in dashed lines for the supply of a cooling medium to the saw blade in the area of the brake action.

The above described adjustment of the bushings 19 and 20 up and down in the direction of the arrows 50 is also possible with regard to the bushings 28 and 29 by loosening the lock nuts 30 and 31. The latter adjustment simultaneously adjusts a spring bias provided by the springs 51 which bias opposes the brake action of the piston rod 38 to keep the brake shoe 34 or rather its linings 39 normally disengaged from the saw blade 3.

Figure 4:
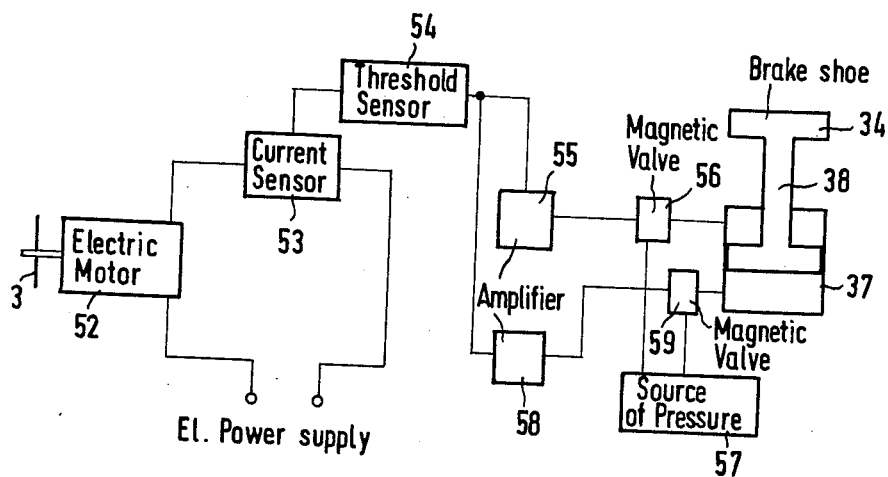
FIG. 4 is a block diagram of a circuit arrangement for sensing the saw motor current for activating and deactivating the brake operating means.

As described above, the operation of the present brake apparatus, more specifically, the brake unit comprising the cylinder 37 and piston rod 38 in response to the current consumption of the electric motor 52 which drives the saw blade 3 through the gear means 1 and the shaft 2, is illustrated in FIG. 4. A current sensor 53 is connected in series in the power supply to the electric motor 52. Such current sensors are well known in the art and provide an output signal indicating the current to the motor 52. An amperemeter could, for example, be used for the purpose. The output of the sensor 53 is connected to a threshold sensor 54 which in turn is connected with its output to amplifiers 55 and 56 which respond to different threshold levels. For example, if an output above a certain threshold level occurs to signify a large current consumption by the motor 52, the amplifier 55 may activate a magnetic valve 56 to supply a pressure medium from a pressure source 57 to the cylinder 37 to thereby move the brake shoe 34 away from the saw blade 3. On the other hand, when the current consumption is low and falls below a certain level, the amplifier 58 is constructed to respond to such low threshold output or no output at the threshold sensor 54 thereby activating a magnetic valve 59 to supply pressure to the opposite side of the piston in the cylinder 37, thereby moving the brake shoe 34 against the saw blade 3.

Figure 5:
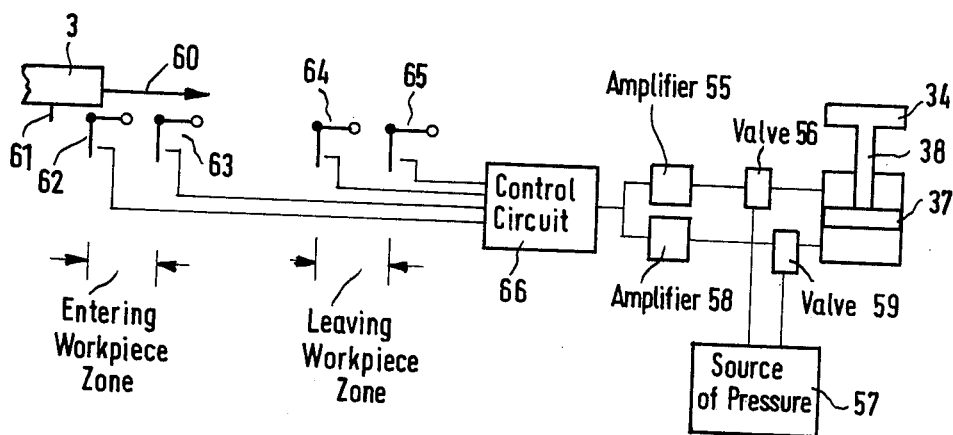
FIG. 5 is a circuit arrangement wherein cam responsive limit switches are employed for the activation and deactivation of the brake power operating means.

FIG. 5 illustrates another embodiment of an arrangement according to the invention, wherein the operation of the brake apparatus is controlled in response to position responsive cam operated switch means. For example, when the saw blade 3 advances in the feed advance direction indicated by the arrow 60, cam means 61 may open or close electric switch contacts 62 and 63 as well as 64 and 65. The positions of the contacts 62 and 63 define a zone in which the saw teeth enter into a workpiece, whereas the positions of the contacts 64 and 65 define a zone in which the saw teeth leave a workpiece. A control circuit 66, for example, comprising relay means responsive to the operations of the just mentioned contacts is provided to energize the amplifiers 55 and 58 to provide the same operation as described above with reference to FIG. 4, wherein a low current consumption by the motor 52 resulted in a breaking action and whereby a large or increase in the current consumption resulted in the stopping of the braking action. Similarly, the brake shoe 34 is applied when the saw blade passes through the zone defined by the switches 62 and 63 and again when the saw blade passes through the zone defined by the switches 64 and 65.

Although the invention has been described with reference to specific example embodiments, it will be appreciated, that it is intended to cover all modifications and equivalents within the scope of the appended claims.

What is claimed is:

1. An apparatus for avoiding play in the drive mechanism of a circular saw, including electric motor means for operating a circular saw blade, comprising brake means, support means supporting said brake means for cooperation with said circular saw blade, power operating means operatively connected to said brake means, sensing means connected to sense the operating status of said circular saw blade, and control means operatively associated with said power operating means and to said sensing means for operating said brake means in response to the instantaneous operating status of said saw blade.

2. The apparatus of claim 1, further comprising housing means, means operatively connecting said support means to said housing means, said support means comprising a first support member secured to said connecting means and extending on one side of the saw blade, a second support member secured to said first member so as to extend across said saw blade, and a third support member secured to said second support member so as to extend opposite the first support member on the other side of the saw blade, said brake means comprising a first brake unit supported by said first support member for cooperation with said one side of said saw blade, and a second brake unit supported by said third support member on the other side of said saw blade for cooperation with said first brake unit, said power operating means comprising piston cylinder drive means operatively connected to said second brake unit to press the latter against said saw blade.

3. The apparatus of claim 2, wherein said sensing means are responsive to the current consumption of said electric motor means so that the brake action is effective when the current consumption is below a predetermined level and so that the brake action is ineffective when the current consumption is above said predetermined level.

4. The apparatus of claim 2, further comprising cam operated limit switch means and cam means operatively arranged relative to the path of feed advance of said saw blade, said control means being responsive to said cam operated limit switch means for controlling said power operating means.

5. The apparatus of claim 2, wherein said first brake unit comprises brake shoe means, guide means operatively connecting said brake shoe means to said first support member, and means for adjusting and locking said brake shoe means in a predetermined position relative to said saw blade.

6. The apparatus of claim 2, wherein said second brake unit comprises brake shoe means, guide means operatively connecting said brake shoe means to said third support member, and means operatively securing said power operating means between said brake shoe means and a fixed point for pressing said brake shoe means against said saw blade.

7. The apparatus of claim 6, further comprising adjustment means operatively arranged between said third support member and said guide means whereby the latter are adjustable in their position relative to said third support member, and spring means interposed between said brake shoe means and said guide means, said spring means tending to return said brake shoe means into an inoperative position against the force of said power operating means.

8. The apparatus of claim 2, further comprising guide means for supporting said first and second brake units, said first and second brake units including brake linings, said guide means comprising duct means for supplying a cooling medium through the brake linings.

9. The apparatus of claim 1, further comprising guide means for said support means, adjustment means operatively connected to said support means for adjusting the latter along said guide means to accommodate saw blades of different diameters.

10. The apparatus of claim 9, further comprising locking means operatively interposed between said guide means and said support means for locking the support means in an adjusted position.

* * * * *